March 9, 1971 C. E. McMICHAEL ET AL 3,568,463
APPARATUS FOR FATTY MATERIALS
Original Filed April 20, 1966

Inventors
Charles E. McMichael
William A. Singleton

Attorney

United States Patent Office 3,568,463
Patented Mar. 9, 1971

3,568,463
APPARATUS FOR FATTY MATERIALS
Charles E. McMichael, Louisville, Ky., and William A. Singleton, Pittsburgh, Pa., assignors to Chemetron Corporation, Chicago, Ill.
Original application Apr. 20, 1966, Ser. No. 543,832, now Patent No. 3,455,700. Divided and this application Dec. 30, 1968, Ser. No. 798,849
Int. Cl. A23d 5/02
U.S. Cl. 62—343       4 Claims

ABSTRACT OF THE DISCLOSURE

An apparatus for preparing a plasticized fatty material which substantially reduces tempering times. A molten fat is cooled and partially crystallized at a first temperature range at a first stage, then worked by agitation to effect partial crystallization at a second temperature higher than the first temperature in a second stage. Subsequently, the material is cooled and worked in a third stage at a temperature lower than the second temperature and at about the same or a lower temperature than in the first stage to form small and well distributed crystal nuclei in the beta prime form.

CROSS REFERENCE TO RELATED APPLICATIONS

This application is a division of application Ser. No. 543,832, filed Apr. 20, 1966, now U.S. Pat. 3,455,700.

This invention relates to an improved apparatus for treating fatty materials and more particularly to an apparatus for manufacturing shortening material which obviates long tempering periods.

The most commercially accepted method for producing plastic shortening agents is to prepare a melted blend of desired fat materials, introduce an inert gas generally in an amount such that the finished product will contain 10–20% of finely dispersed gas, precool the mixture of fat and inert gas to a temperature close to the solidification point of the fat, rapidly and simultaneously agitate and supercool the mixture to below its normal solidification temperature and subsequently work by agitating the partially solidified mixture without additional cooling until crystallization approaches completion. The semi-plastic product is then passed through an extrusion valve, filled into containers and held in a quiescent state under a predetermined and controlled temperature of between about 75°–85° F. until solidification is achieved. This final step is referred to as tempering.

Apparatus extensively employed for performing the above operations and manufactured by the Votator Division of Chemetron Corporation comprises a precooler, one or more externally chilled tubes (commonly referred to as "A" units) which are provided with internal rotating shafts fitted with scraper blades for removing the thin film of chilled material from the tube walls and one or more worker tubes (commonly referred to as "B" units) which are provided with internal rotating shafts fitted with spirally positioned pins for working by agitating the product as it further crystallizes. The foregoing procedure, as well as the referred to apparatus, are fully described on pages 1064–1068 of A. E. Bailey book "Industrial Oil and Fat Products," 3rd edition (Interscience Publishers, Division of John Wiley & Sons). It should be noted that at lines 23–26 inclusive on page 1068 of Bailey that tempering times up to 72 hours are indicated to attain optimum consistency and creaming characteristics. Tempering for periods in excess of 72 hours is practiced frequently.

Attempts to eliminate the tempering period are indicated in U.S. 3,117,011 wherein the fatty triglycerides are heated under quiescent conditions at a temperature in the range of 90–110° F. Another approach at eliminating tempering periods is that taught in U.S. 3,006,770 where the "A" and "B" units are not employed and a fat is atomized in a molten state in a crystallization zone maintained under conditions of temperature so that a very fine mist of the molten fat is contacted with a cooling gaseous medium to cause crystallization of the fat or shortening composition without marked supercooling.

As previously stated, the vast majority of shortening produced commercially at present employs the "A" and "B" units and as indicated in U.S. 3,117,011 the shortening industry has always deemed it necessary to keep a shortening product previously processed in an "A" and "B" unit in a quiescent state and at a controlled temperature once it leaves the "B" unit in order to produce a commercially acceptable shortening product having the desired consistency or plasticity. Other methods of treating fats which do not employ the "A" and "B" units have not met with commercial acceptance.

It is an object of the present invention to provide an improved apparatus for preparing a plasticized fatty material. It is another object of this invention to provide an apparatus for preparing a plasticized shortening which eliminates long tempering times and large storage rooms. It is still another object of the present invention to provide an apparatus for preparing a shortening material which employs a minimum number of steps and with apparatus which is presently commercially available. These and other objects of the present invention will be apparent from the following detailed description, and the drawing, in which:

Figure 1:
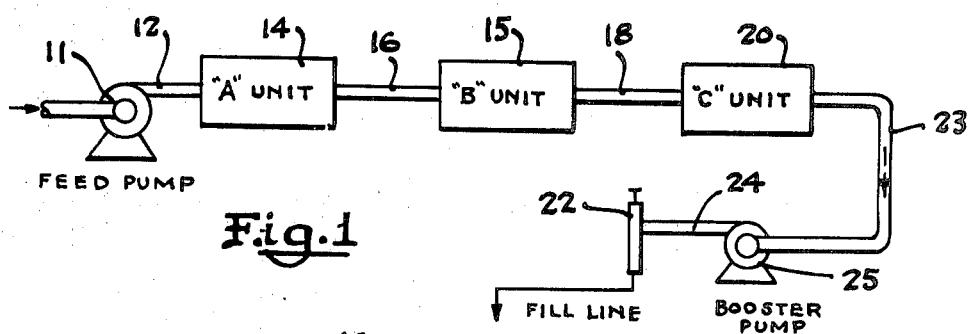
FIG. 1 is a flow diagram of the process and apparatus of the present invention.
Figure 2:
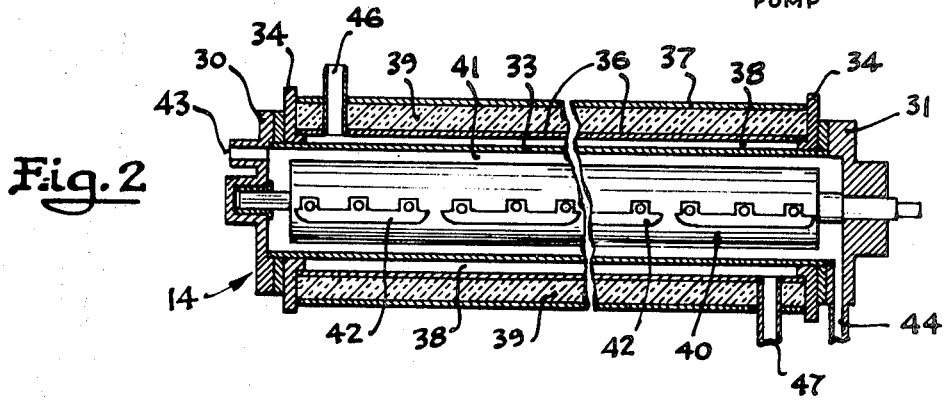
FIG. 2 is a view in vertical section showing somewhat schematically the internal construction of a preferred form of the heat exchange unit, having a concentrically positioned rotating shaft.
Figure 3:
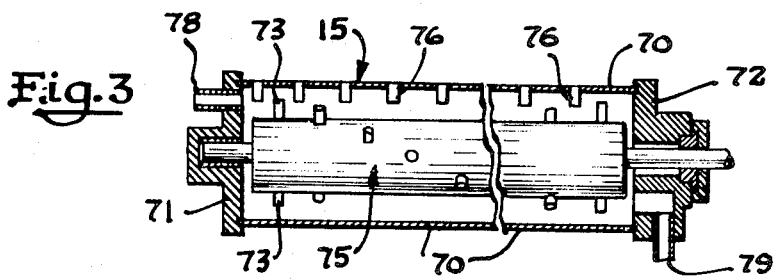
FIG. 3 is a view like FIG. 1 of the preferred worker unit.
Figure 4:
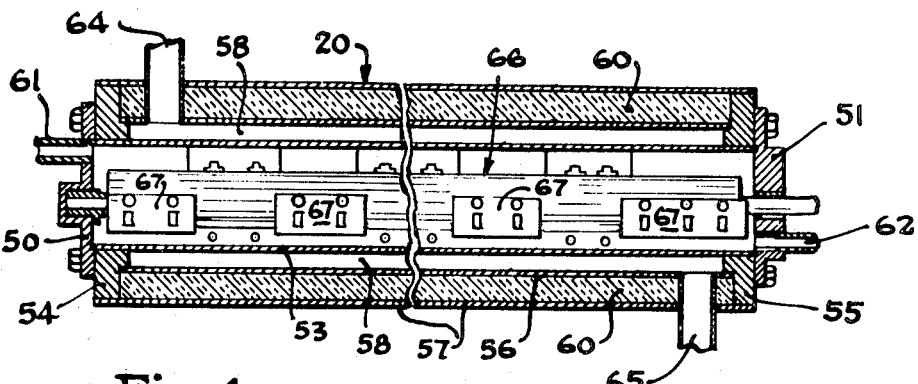
FIG. 4 is also a view in vertical section showing somewhat schematically the internal construction of a preferred form of another heat exchange unit, having an eccentrically positioned rotating shaft.

In a preferred embodiment of the invention, illustrated in FIGS. 1–4, a molten fat is introduced under pressure by means of feed pump 11 and conduit 12 into a standard "A" unit 14 wherein the fat is partially crystallized and passed into the "B" unit 15 by means of conduit 16. After working by agitation in unit 15, the fat is conveyed through conduit 18 through a "C" unit 20, wherein it is further worked and cooled and subsequently fed through an extrusion valve 22 to a fill line by means of conduits 23 and 24, the necessary pressure or force being provided by booster pump 25.

As previously indicated, units 14 and 15 are standard equipment, and unit 20 is a commercially available apparatus which is described in a U.S. patent application filed Feb. 4, 1965, Ser. No. 432,447 by Henry W. Bevarly, and assigned to Chemetron Corporation now U.S. 3,385,354. All of the equipment, being adequately described in publications, only a brief description will be given herein. Referring to the heat exchange unit, generally 14, a pair of generally circular end plates 30 and 31 are recessed to receive the ends of the heat transfer tube 33. Ring members 34 are sleeved on tube 33 adjacent to the end plates and support a pair of cylindrical elements 36 and 37 to provide an annular space 38 for heat transfer fluid around tube 33. The space between the elements is filled with insulation 39 to provide an insulating jacket. A rotatable shaft 40 is journaled in end plates 30 and 31 and disposed concentrically within tube 33, filling a major portion of the space within the tube and forming an elongated annular passage 41 for the shortening material. Shaft 40 carries a plurality of blades or scrapers 42 to prevent sticking of the material to the inner surface of tube 33. A suitable drive mechanism (not shown) is provided to rotate the shaft at the desired speed. Shortening material enters unit 14 through inlet conduit 43 and leaves through outlet conduit 44 at the opposite end. Heat transfer fluid is conducted to and from the annular space 38 by connections 46 and 47.

Unit 20, like unit 14, also comprises a pair of generally circular end plates 50 and 51, recessed to support the ends of heat transfer tube 53. Ring members 54 and 55 are sleeved on tube 53 and support a pair of cylindrical elements 56 and 57 to provide an annular space 58 for heat transfer fluid around tube 53. The space between the elements is filled with insulation 60. Shortening material enters unit 20 through inlet conduit 61 at one end and leaves through outlet conduit 62 at the opposite end. Heat transfer fluid is conducted to and from annular space 58 by connections 64 and 65. A major and substantial difference between units 14 and 20 is in the positioning of rotating mutator shaft 66, the axis of the shaft being offset, or eccentric with tube 53, so that the shaft is nearer the heat exchanger surface in one transverse section than in other sections. This is accomplished by having shaft 66 journaled in end plates 50 and 51 in an eccentric manner. A plurality of blades 67 are hingedly attached to shaft 66 to provide contact at all times with the inner surface of tube 53 and a position around the shaft to aid in the movement of shortening material through the ever changing dimensions of the passage between shaft 66 and tube 53 as shaft is rotated by a drive means (not shown). In unit 20, on rotation around the shaft, a representative particle of material will be subjected to the rotational force of a large number of revolving blades. It will also be subjected to increasing pressures followed by decreasing pressures as the material escapes from the high pressure zone, as by moving forward or backward longitudinally or as by escaping around the moving blades in a direction counter to the direction of the blades and shaft to reach a lower pressure zone behind the blades. Further, a representative particle will move inwardly and outwardly from the rotating shaft as pressures and velocities vary. While the off-center shaft heat exchanger is the preferred apparatus, other apparatus capable of simultaneously cooling and working a semi-plastic material may be employed, such as the heat exchanger and mixer apparatus described in U.S. Pat. No. 3,235,002 by Bevarly et al. which is also assigned to Chemetron Corporation. The apparatus of Bevarly et al. also has an off-center type shaft in a tubular heat exchanger. However, while one end of the shaft is eccentric with respect to the centerline of the heat transfer tube, the other is concentric. The eccentricity of the shaft is essential to impart sufficient and desired working or kneading to the plasticized mass and still prevent a mere rotation of the material within the tubular scraped surface heat exchanger.

Unit 15, unlike units 14 and 20, has no heat exchange means, but it does have the usual cylindrical tube 70 mounted by means of end plates 71 and 72. Thorough mixing with low shear is accomplished by a series of pins 73, arranged in a helical pattern on shaft 75, which cooperate with a row of similar stationary pins 76 mounted in the wall of tube 70. Shaft 75 is rotated by drive means (not shown) and product enters by connection 78 and leaves by connection 79 in the respective end plates.

The preferred temperature ranges for the present process are 60° F. to 80° F. in the first zone represented by the "A" unit; 75° to 85° F. in the second zone represented by the "B" unit and 55° to 75° F. in the third zone created by the previously described off-center shaft apparatus referred to herein as the "C" unit. The temperature ranges in the first and second zones are those normally employed for a specific shortening product being processed by the conventional method. Best results as far as product quality and elimination of tempering are concerned, are achieved when the temperature in the third zone is equivalent to or slightly below the temperature of the product as it is discharged from the first zone. The processed product is filled in suitable containers such as 50 pound or larger containers by standard methods at a preferable temperature in the range of 65–85° F.

Shortening which may be treated by the method of this invention include both blended and all hydrogenated types prepared from animal or vegetable fats, mixtures thereof, as well as the emulsified and standard all-purpose household shortening. The typical shortening should have a Wiley melting point in the range of about 102°–120° F. Solid fat indices for typical shortenings at 50° F. range from 20 to 60. The unsaturated hydrogenated shortenings which can be processed by this invention have iodine values from about 65 to about 85.

Irrespective of the type of shortening employed it has been found that the consistency of the shortening prepared in accordance with the present invention reached equilibrium in much shorter time when employing the "C" unit. In most instances equilibrium is reached within eight hours after filling from the "C" unit, whereas it required four days for the same shortening to do so when processed in the conventional manner.

The invention is disclosed in further detail by means of the following examples which are set forth for the purpose of illustrating the invention, but in no way are to be construed as limiting the invention in spirit or scope.

EXAMPLE I

A typical high ratio type shortening was selected having the following general characteristics:

Composition—Hydrogenated vegetable oil
Color—6y–0.6 Red
Free fatty acids—0.05%–0.06%
Wiley melting point—116.0° F.–117.8° F.
Monoglycerides (alpha)—3.5%–3.6%
Solid fat index:
    At 50° F.—23.4–25.7
    At 70° F.—17.7–19.9
    At 92° F.—12.7–14.4
    At 104° F.—8.3–9.4

The foregoing described shortening at a temperature of 130°–140° F. was pumped at a throughput rate of about 7500 lbs./hr. from a suitable supply tank to a standard precooler where it was cooled to a temperature of about 110°–115° F. and then entered the Votator "A" unit assembly. The product was chilled to 70° F. in the "A" unit and discharged from the "B" unit at 80° F. The product was transferred from the "B" unit at a temperature of 80° F. and cooled in the off-center shaft Votator "C" unit to a temperature of 68° F. From the "C" unit the chilled product was pumped by means of a standard gear type booster pump through an extrusion valve to a standard filling machine where the product was filled in 50 pound containers at a temperature of 73° F.

The consistency of the product as processed in this example reached equilibrium within eight hours after filling. The same shortening, when processed in a system employing only the conventional "A" and "B" units, required four days for the crystalline structure to reach equilibrium. The temperatures from the "A" and "B" unit in the conventional system were the same, but the fill temperature was 84° F.

Performance tests were made in pound cake employing the shortening processed with the herein described "C" unit in accordance with Example I versus the same shortening processed in the indicated conventional manner. The results are shown in Table I below wherein column B represents a shortening made by the conventional system employing only "A" and "B" units.

TABLE I

| Material | 24 hours after filling A | 10 days after filling A | 10 days after filling B |
|---|---|---|---|
| Batter, sp. gr | 0.78 | 0.80 | 0.84 |
| Volume, cc./lb | 1,285 | 1,270 | 1,190 |

EXAMPLE II

Employing the same shortening material set forth in Example I and the general procedure outlined therein, Table II below illustrates runs made under various conditions of processing as well as performance results.

TABLE II

| Run Number | 1 | 2 | 3 | 4 | 5 |
|---|---|---|---|---|---|
| Temperature from "A" unit, °F | 69 | 68 | 69 | 69 | 69 |
| Temperature from "B" unit, °F | 83 | 82 | 83 | 83 | 83 |
| Temperature from "C" unit, °F | 69 | 69 | 68 | | |
| Temperature from booster pump | 73 | 73 | | | |
| Temp. from 2nd "B" unit | | 75 | | | |
| Temperature at filler | 83 | 84 | 77 | 85 | 85 |
| Pressure (p.s.i.g.) | 500 | 500 | 500 | 300 | 500 |
| Rate (lbs. per hour) | 7,800 | 7,800 | 7,800 | 7,800 | 7,800 |
| 24 hours after filling cream icing, sp. gr. at 15 min | 0.76 | 0.76 | 0.75 | 0.75 | 0.78 |
| 24 hours after filling pound cake: | | | | | |
| Batter, sp. gr | 0.79 | 0.83 | 0.83 | 0.85 | 0.87 |
| Cake volume, cc./lb | 1,230 | 1,160 | 1,190 | 1,150 | 1,140 |
| 10 days after filling pound cake: | | | | | |
| Batter, sp. gr | 0.82 | | | 0.85 | 0.85 |
| Cake volume, cc./lb | 1,220 | | | 1,110 | 1,120 |

Runs 4 and 5 represent conventional processing without the "C" unit, while Run 1 employing the "C" unit shows that the pound cakes were just as good when made with shortening 24 hours after packing as they were 10 days after packing. Runs 4 and 5 did not produce as good pound cake as Run 1 either after 24 hours or 10 days.

No significant improvement is shown, as measured by pound cakes, when the second "B" unit was used as shown in Run 2.

There appears to be no significant advantage in using a "C" unit for the production of shortenings to be used for making cream icings, but as the same shortening is frequently used for pound cakes, white layer cakes, and cream icing, it is an advantage to make such shortenings with the "C" unit employed.

It will be noted that a booster pump of a standard gear type was used in Runs 1 and 2 and that an additional "B" unit was used in Run 2. It is known that with conventional operation, using only the "A" and "B" units, the super cooled product leaving the "A" and "B" units is still in a semi-fluid state indicating that the actual solid fat content is below the equilibrium solid fat index (SFI) for the product at the processing temperature. When the off-center shaft "C" unit is used following the "A" and "B" units it is necessary to operate at a much higher extrusion pressure at the filler of about 500 pounds/square inch for the proper fill as the product is much firmer indicating that the actual solid fat content approaches the equilibrium SFI of the product at the processing temperature. The use of a booster pump is preferred in actual practice to avoid excessive pressures within the preceding items of apparatus. As additional work is imparted to the product in passing through the booster pump, a second "B" unit was installed experimentally following the booster pump as illustrated by Run 2 to determine if further working of the product would be advantageous. As indicated by the data, an acceptable product was obtained when compared to the conventionally processed shortening of Runs 4 and 5, but inferior to the product obtained in Runs 1 and 3 where the additional "B" unit was not employed.

EXAMPLE III

An average high ratio type shortening was selected having the following characteristics:

Free fatty acids (as oleic)—0.05%
Wiley melting point—116.0° F.
Iodine value—81.8
Monoglycerides (alpha)—3.6%
S.F.I.:
    At 50° F.—23.4
    At 70° F.—17.7
    At 92° F.—12.7
    At 104° F.—8.3

This material was prepared employing the general procedure outlined in Example I under the conditions described in the following Table III which also illustrates performance results.

TABLE III

| Run Number | 1 | 2 | 3 | 4 | 5 |
|---|---|---|---|---|---|
| Temperature from "A" unit, °F | 70 | 70 | 70 | 70 | 70 |
| Temperature from "B" unit, °F | 80 | 80 | 78 | 79 | 80 |
| Temperature from "C" unit, °F | 65 | 70 | 60 | 65 | 60 |
| Temperature from 2nd "B" unit, °F | | | | 68 | 64 |
| Temperature from booster pump, °F | | | | 64 | 72 | 68 |
| Temperature at filler, °F | 73 | 76 | 72 | 78 | 75 |
| Temperature extrusion at filler | 500 | 500 | 500 | 500 | 500 |
| Product rate, lbs./hr | 7,500 | 7,500 | 7,500 | 7,500 | 7,500 |
| Within 8 hours after pack, pound cake: | | | | | |
| Batter, sp. gr | 0.85 | 0.83 | 0.85 | 0.82 | 0.83 |
| Cake volume, cc./lb | 1,175 | 1,220 | 1,170 | 1,175 | 1,140 |
| 24 hours after pack: | | | | | |
| Batter, sp. gr | 0.79 | 0.79 | 0.82 | 0.86 | 0.82 |
| Cake volume, cc./lb | 1,200 | 1,200 | 1,190 | 1,140 | 1,150 |

The foregoing runs indicate a commercially acceptable product without the normal tempering periods.

In this example an additional "B" unit was employed experimentally ahead of the booster pump for Runs 4 and 5. Again the resultant product subjected to this additional work was found to be acceptable but inferior to that produced in Runs 1, 2 and 3 where no additional "B" unit was employed. All runs indicated that within only eight hours after fill, a shortening product having characteristics generally comparable with a fully tempered product was obtained.

EXAMPLE IV

An all-purpose, non-emulsified shortening was selected having the following characteristics:

Color—6y–0.6 red
Free fatty acid—0.02%
Wiley melting point—116.2° F.
S.F.I.:
   At 50° F.—26.1
   At 70° F.—20.6
   At 92° F.—14.8
   At 104° F.—9.1

The foregoing described shortening was heated to 135–140° F. in a suitable supply tank from which it entered the concentric shaft Votator "A" unit within the same temperature range. The product was chilled to 69° F. in the "A" unit and discharged from the "B" unit at 78° F. The product was transferred from the "B" unit and processed in the off-center shaft Votator "C" unit at a temperature of 70° F. From the "C" unit the chilled product was pumped by a gear type booster pump to a pressure of 300 p.s.i.g. to a standard filling station where the product was filled into fifty pound containers at a temperature of 78° F. The product rate through the "A," "B" and "C" units was 8,000 pounds per hour.

Baking tests in pound cake were made on the shortening product twenty hours after packing with the results illustrated in Table V.

TABLE IV

| Material: | Data |
|---|---|
| Batter (sp. gr.) | 0.86 |
| Batter temperature °F | 74 |
| Cake volume cc./lb | 1100 |

EXAMPLE V

Another all-purpose, non-emulsified shortening was selected having the following characteristics:

Color—5y–0.5 red
Free fatty acid—0.02%
Wiley melting point—115.4° F.
S.F.I.:
   At 50° F.—25.0
   At 70° F.—19.8
   At 92° F.—13.5
   At 104° F.—8.9

The same general procedure as outlined in Example IV was followed employing the data in Table V below which also illustrates performance results.

TABLE V

| Designation: | Amount |
|---|---|
| Temperature from "A" unit °F | 66 |
| Temperature from "B" unit °F | 81 |
| Temperature from "C" unit °F | 68 |
| Temperature at filler °F | 78 |
| Pressure at filler p.s.i.g. | 300 |
| Rate in pounds per hour | 8000 |
| 20 hours after filling—pound cake (batter) (sp. gr.) | 0.85 |
| Batter temperature °F | 75 |
| Cake volume cc./lb | 1060 |

The shortenings of Examples IV and V show normal texture and performance within 24 hours after packing, comparable to the results obtained with conventionally processed nonemulsified shortenings.

The pound cakes and cream icings employed in the performance tests in Examples I–V are prepared from standard recipes as indicated from the following ingredients:

POUND CAKE

| Ingredients: | Amounts | |
|---|---|---|
| | Pounds | Ounces |
| Shortening | 1 | 7 |
| Granulated sugar | 2 | 7 |
| Salt | 0 | 1 |
| Cake flour | 2 | 0 |
| Liquid milk | 1 | 0 |
| Vanilla | 0 | ½ |
| Whole eggs | 1 | |

CREAM ICING

| Ingredients: | Amounts | |
|---|---|---|
| | Pounds | Ounces |
| Powder sugar 6X | 3 | 0 |
| Shortening | 0 | 14 |
| Powder skim milk | 0 | 3 |
| Salt | 0 | ¼ |
| Vanilla | 0 | ¼ |
| Water | 0 | 8 |

Both recipes were prepared in the same manner for the conventionally processed shortening and for the shortening according to the process of this invention. As such preparations are familiar to those skilled in the baking and pastry art they are not set forth.

While the phenomena associated with tempering of shortenings by any method is not clearly understood, it is known that the end result is the formation of a stable crystalline mass with the preponderance of crystals existing in the beta prime form for most products. It is believed that the further chilling operation with concurrent working of the product as taught by this invention with reduction of the product temperature to about the same or slighly lower temperature of the first chilling operation, results in the formation of additional small crystal nuclei and yields a saturated crystalline mass with uniform crystal distribution in essentially a state of equilibrium.

The examples of this invention illustrate that the use of the "A," "B" and "C" units produce a shortening material that is equivalent and even more generally superior to shortenings produced by conventional methods. The examples further show that such shortening materials do not require the long tempering periods as do conventionally processed shortenings. Further evidence of a well tempered product and one exhibiting smaller and more uniformly distributed crystals has been noted through crystallographic studies. Small and uniform crystal structures enhance a fat's aerating properties which are so important in the preparation of toppings and particularly in cakes where high volumes and even texture are desired.

It will thus be seen that there is now provided an apparatus for producing a shortening material which has all of the characteristics of a product which formerly required a tempering period of from 24–240 hours. Large tempering storage rooms are no longer required and the product can be shipped directly from the filling apparatus. A substantial reduction in handling and storage is thereby effected resulting in a reduction in production costs.

Others may practice the invention in any of the numerous ways which will be suggested by this disclosure to one skilled in the art by employing one or more of the novel features disclosed or equivalents thereof. All such practice of the invention is considered to be a part hereof provided it falls within the scope of the appended claims.

We claim:

1. An apparatus for producing a plasticized fatty material from a liquid fatty material such that the formerly required tempering time is substantially reduced comprising a first means to cool and partially crystallize a molten fatty material, a second means to work by agitation said partially crystallized fatty material and to form a plasticized material therefrom, means for conveying said material from said first means to said second means, a third means to cool and work by kneading action said plasticized material to effect well distributed crystal nuclei and substantial equilibrium in the crystalline structure, said third means comprising a tubular heat exchanger and an eccentric shaft of working blades therein, and means for conveying said material from said second means to said third means.

2. An apparatus as defined in claim 1 wherein said first means comprises a tubular heat exchanger and a concentric shaft of working blades therein.

3. An apparatus as defined in claim 2 wherein said second means comprises a cylindrical chamber, a shaft of helically positioned pins on said shaft and corresponding pins disposed in the wall of said chamber.

4. An apparatus as defined in claim 3 further including a booster pump for conveying the plasticized material processed in said third means.

References Cited

UNITED STATES PATENTS

| 1,965,617 | 7/1934 | Vogt | 62—68 |
| 2,875,067 | 2/1959 | Holman et al. | 99—122 |
| 2,980,539 | 4/1961 | Bevarly | 99—122X |
| 3,019,110 | 1/1962 | Bevarly | 99—122 |
| 3,142,171 | 8/1964 | Morgan, Jr., et al. | 62—348X |

WILLIAM E. WAYNER, Primary Examiner